Patented May 5, 1925.

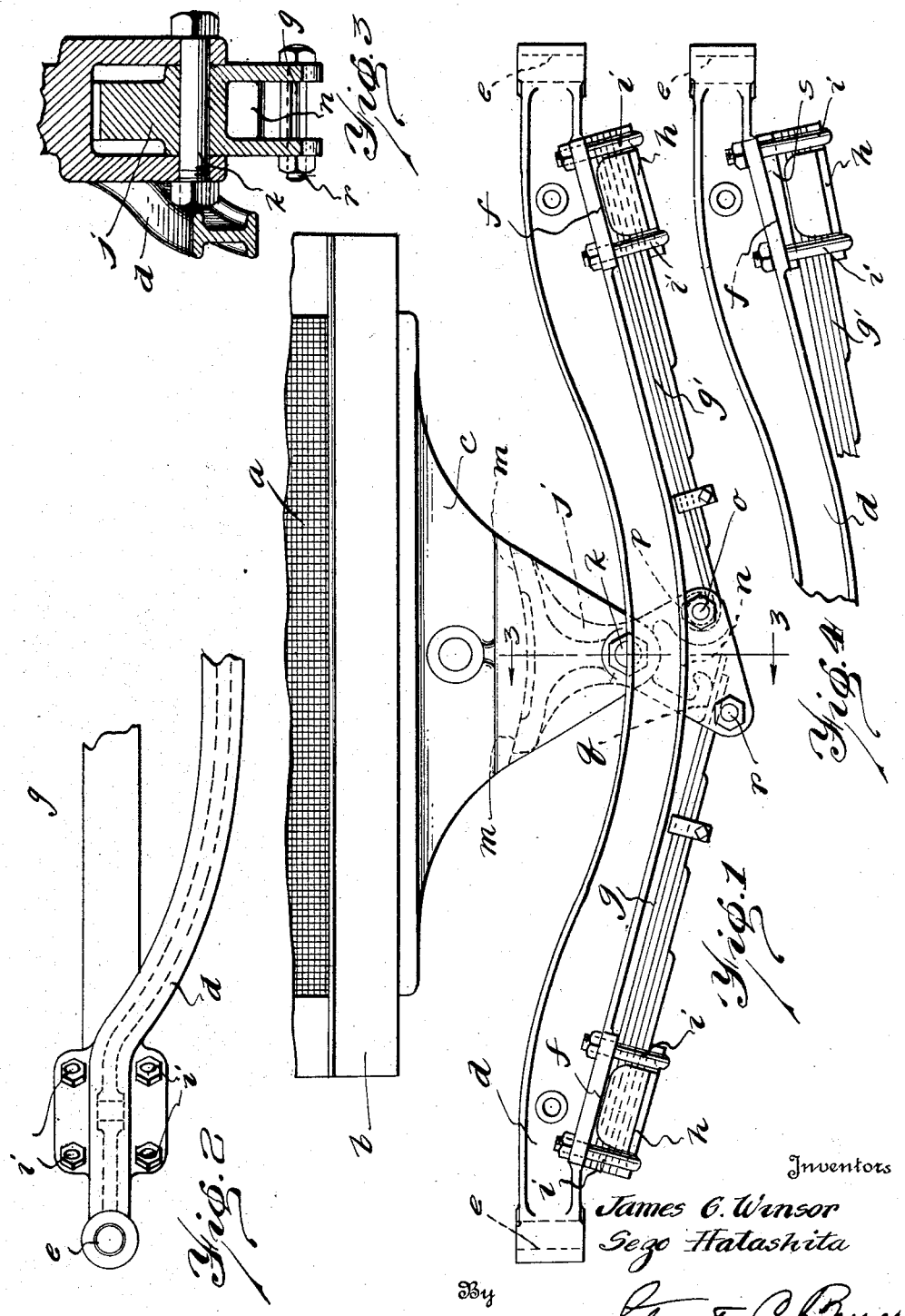

1,536,995

UNITED STATES PATENT OFFICE.

JAMES G. WINSOR AND SEZO HATASHITA, OF DETROIT, MICHIGAN.

VEHICLE SPRING SUSPENSION.

Application filed August 3, 1923. Serial No. 655,405.

*To all whom it may concern:*

Be it known that we, JAMES G. WINSOR and SEZO HATASHITA, JAMES G. WINSOR a citizen of the United States and SEZO HATASHITA a subject of Japan, residing at Detroit, in the county of Wayne and State of Michigan, have invented certain new and useful Improvements in Vehicle Spring Suspensions, of which the following is a specification.

This invention relates to vehicle spring suspension and more particularly to that type of spring suspension that is arranged to support the front axle of a Fordson tractor.

It has been customary to mount the front axle of a Fordson tractor directly onto the chassis frame. The operator sometimes desires to use wheels larger or smaller in diameter as the occasion demands.

In our co-pending application Serial No. 648,645, we have disclosed means for providing a spring suspension for the front axle, including means for adjusting the same so as to use larger or smaller wheels.

This invention is an improvement over the above mentioned application and is so arranged that wheels of different diameter may be easily installed on the tractor without necessitating the change in the central shackle construction.

In the drawings:

Fig. 1 is an elevational view of the spring assembled onto the tractor.

Fig. 2 is a fragmentary plan view of one end of the axle and spring.

Fig. 3 is a section on the line 3—3 of Fig. 1.

Fig. 4 is a fragmentary elevational view showing the means for obtaining the adjustment necessary in using wheels of larger or smaller diameter.

The radiator $a$ is supported on the chassis frame $b$, which has secured thereto and depending therefrom, a bracket $c$ of the standard construction. My special form of axle $d$ is provided with the usual holes $e$ for taking the steering knuckle pin. This axle is bowed outwardly and downwardly as shown and is provided on the underside thereof with the bearing surface $f$. A pair of leaf springs $g$ and $g'$ each have one end secured to the bearing surface $f$ by means of a clamp $h$, and U-bolt and nut $i$.

We have provided a fixture $j$ which is adapted to be secured in the yoke bracket $c$ by means of a bolt $k$. The upper part of this fixture is arranged to abut against the inside face of the yoke bracket as at $m$. It is thus seen that the fixture is securely held within the bracket $c$.

The lower part of the fixture $j$ below the shackle bolt $k$ is cored out as at $n$, and a shackle bolt $o$ is carried near the lower end of the fixture around which the eye $p$ of the spring $g'$ is secured. The other spring $g$ is not formed with an eye at its free end, but is extended straight and arranged to be slidably engaged between the wall $q$ of the fixture, and the bolt $r$ carried by the fixture. The connection between the axle and the chassis frame is plainly evident, and it will be noted that the spring $g'$ functions as a radius rod with the bolt $o$ as a center. This will be permitted by the sliding connection of the spring $g$ with the fixture.

In Fig. 4 we have shown the adjustable means for adjusting the height of the axle from the ground when it is necessary to change the wheels to those having larger or smaller diameters. We provide a wedge $s$ which can be inserted between the bearing surface $f$ carried by the axle and the leaves of the spring. This wedge will change the inclination of the leaf spring, and as shown in Fig. 4, the axle will be lowered from the position as shown in Fig. 1, where no wedge is used. This will enable the operator to use a wheel of a smaller diameter, the inclination of the walls of the wedge determining the proper adjustment for wheels of different sizes. It is quite evident that if the wedge $s$ were reversed, the angle of inclination of the spring would be increased thereby, raising the axle so that a wheel of a larger diameter could be used.

This arrangement enables the operator to maintain a permanent fixture secured to his depending yoke brackets secured to the chassis frame, and to adjust the height of the axle from the ground without disconnecting the axle and spring from the central shackle construction. The operator merely loosens the U-bolts that clamp the spring and inserts the wedge having the required taper for the wheel he desires to put on the tractor. Most of the strain comes at the central portion where the axle is shackled to the chassis frame, and by using this form of adjustment we have been able to secure a fixture which is strong enough to take the strain, and which will eliminate the tendency to side sway.

What we claim is:

1. In a vehicle spring suspension, the combination of a chassis frame, an axle, a pair of inwardly and downwardly extending leaf spring members, each having one end secured to the axle near the end thereof, and a fixture rigidly secured to the chassis frame, the free end of one of the spring members pivotally secured to said fixture and the free end of the other spring member slidably secured to said fixture.

2. In a vehicle spring suspension, the combination of a chassis frame, an axle, a pair of inwardly and downwardly extending leaf spring members, each having one end secured to the axle near the end and to the underside thereof, and a fixture rigidly secured to the chassis frame being positioned centrally thereof and extending below the axle, the free end of one of the spring members pivotally connected to said rigid fixture, and the free end of the other spring member slidably connected to said rigid fixture.

3. In a vehicle spring suspension, the combination of a chassis frame provided with a depending bracket, an axle having its central portion bowed outwardly, a pair of spring members anchored to the axle near the ends thereof and extending inwardly substantially perpendicularly to the axis of the chassis frame, and a fixture secured to the depending bracket carried by the chassis frame provided with a shackle bolt and having a cored out interior and provided with an opening on one side opening into said cored out interior, the free end of one spring member pivotally secured to said shackle bolt, and the free end of the other spring member slidably mounted in said opening carried by the fixture.

4. In a vehicle spring suspension, the combination of a chassis frame provided with a depending bracket, an axle, a pair of inwardly extending spring members, each having one end secured to the axle near the end thereof and a fixture bolted to said depending bracket and provided with a saddle portion which abuts the depending bracket for rigidly supporting the fixture when the same is bolted thereon, the free end of one spring member pivotally connected to the fixture and the free end of the other spring member slidably connected thereto.

In testimony whereof we affix our signatures.

JAMES G. WINSOR.
SEZO HATASHITA.